United States Patent [19]
Khelifa et al.

[11] Patent Number: 5,435,150
[45] Date of Patent: Jul. 25, 1995

[54] APPARATUS FOR HEATING AND/OR COOLING A CABIN

[75] Inventors: Noureddine Khelifa, Stuttgart; Karl-Gerd Krumbach, Burgstetten, both of Germany

[73] Assignee: Behr GmbH & Co., Stuttgart, Germany

[21] Appl. No.: 186,524

[22] Filed: Jan. 26, 1994

[30] Foreign Application Priority Data

Feb. 6, 1993 [DE] Germany .................. 43 03 478.0

[51] Int. Cl.$^6$ .................. B60H 1/00; F25B 17/08; F25B 29/00
[52] U.S. Cl. .................. 62/271; 62/239; 62/94; 165/42
[58] Field of Search .................. 62/271, 239, 244, 92, 62/94, 95, 467, 476; 165/42, 60

[56] References Cited

U.S. PATENT DOCUMENTS

| | | | |
|---|---|---|---|
| 2,075,036 | 3/1937 | Hollis | 183/4 |
| 2,136,513 | 11/1938 | Lednum | 62/271 |
| 2,344,384 | 3/1944 | Altenkirch | 183/4.7 |
| 2,811,223 | 10/1957 | Newton | 62/271 |
| 4,570,360 | 2/1986 | Nakagomi | 34/80 |
| 5,327,739 | 7/1994 | Ingersoll et al. | 62/78 |
| 5,335,719 | 8/1994 | Khelifa et al. | 165/42 |

FOREIGN PATENT DOCUMENTS

| | | |
|---|---|---|
| 572293 | 11/1958 | Belgium . |
| 167096 | 1/1986 | European Pat. Off. . |
| 0167096 | 1/1986 | European Pat. Off. . |
| 3237377 | 4/1984 | Germany . |
| 59-66627 | 4/1984 | Japan . |

OTHER PUBLICATIONS

Patent Abstracts Of Japan, vol. 8, No. 174 (M-316) (1611), Aug. 10, 1984, (abstract of JP-A-59 066 627, published Apr. 16, 1984).

Primary Examiner—Henry A. Bennet
Assistant Examiner—William C. Doerrler
Attorney, Agent, or Firm—Foley & Lardner

[57] ABSTRACT

An apparatus for heating and/or cooling a cabin, especially a passenger compartment of a motor vehicle, a sleeping cabin of a truck, or the like. To the cabin there is respectively connected an intake-air duct and a waste-air duct. The apparatus includes a sorption reactor which is filled with zeolite, or the like, and through which an air-current flows via corresponding ducts. In the adsorption phase of the reactor, the air-current takes up adsorption heat and releases moisture. After being cooled down via a humidifier, the air-current cools the intake-air current to the cabin. In addition, a heating device is provided for heating up the air current for the desorption of the reactor, the heated air current being evacuated with the moisture taken up from the sorbent. In order to provide sufficient heating capacity, even at low external temperatures, without placing a load upon the sorption reactor, the air current is selectively made to flow through the heating device into either a duct to the reactor or directly as a heating-air current to the cabin via an air current control element.

18 Claims, 7 Drawing Sheets

APPARATUS FOR HEATING AND/OR COOLING A CABIN

BACKGROUND OF THE INVENTION

The present invention relates to an apparatus for heating and/or cooling a cabin, and more particularly to an apparatus for heating and/or cooling a passenger compartment of a motor vehicle, a sleeping cabin of a truck, or the like.

In German Patent Application P 41 25 993.9, an apparatus for air-conditioning a cabin of a motor vehicle is described in which an exhaust-gas heat exchanger is used as the heating device for generating a hot-air current required for the desorption. The energy necessary for the desorption is thus able to be supplied when the motor vehicle is running.

Cooling of a cabin using a sorption reactor of the type previously described is satisfactorily accomplished even on hot days; however, the available heating capacity from the sorption reactor can be inadequate at very low temperatures since the dissipated heat which is lost, e.g., via window surfaces, is considerable. Moreover, the heating capacity of the sorption reactor is affected by the humidity of the air supplied to the reactor. For this reason, when dry, cold air is supplied, a humidification of the air current is necessary. This in turn creates problems, such as icing-up of the air ducts. Furthermore, if the air supplied to the reactor is heavily humidified, then the capacity of the sorbent is also rapidly exhausted, making frequent desorption phases necessary. Particularly in the case where an engine has been running for short distances, there is insufficient waste heat from the engine available for the desorption of the sorbent.

SUMMARY OF THE INVENTION

Accordingly, it is an object of the present invention to provide an apparatus for heating and cooling a cabin of a motor vehicle which can adequately heat the cabin rapidly when the load on the sorbent is low, even under low external temperatures.

In accomplishing these and other objects, there is provided according to one aspect of the present invention an apparatus for heating and/or cooling a cabin in a motor vehicle, comprising a sorption reactor defining therein a reaction chamber containing a sorbent; a first reactor duct which carries an air current into the reaction chamber; a second reactor duct leading from the reaction chamber; an intake-air duct connected between the second reactor duct and the cabin; a humidifier disposed in the intake-air duct; a heating device; and a first air-current control element positioned so as to selectively communicate a heating-air current issuing from the heating device to either a reactor duct or the cabin. During adsorption of the reactor, an air current flowing through the reactor thereby takes up adsorption heat while releasing moisture, and is cooled by the humidifier before flowing into the cabin. During desorption of the reactor, the air current is heated by the heating device and flowed through the reactor to take up moisture. In a preferred embodiment, a bridging duct is connected at one end via an air-current control element to the first reactor duct and at another end to the second reactor duct via a fourth air-current control element.

According to another aspect of the invention, there is provided an apparatus for heating and/or cooling a cabin in a motor vehicle, comprising a first sorption reactor defining therein a reaction chamber containing a sorbent; a second sorption reactor defining therein a reaction chamber containing a sorbent; each of the sorption reactors having a first reactor duct which carries an air current into the reaction chamber, and a second reactor duct leading from the reaction chamber; an intake-air duct connected between the second reactor ducts and the cabin; a humidifier disposed in the intake-air duct to cool an intake-air current into the cabin; a heating device; a waste-air duct connected between the cabin and the heating device; means for communicating, during a cooling phase, a heating-air current from the heating device to one of the reactors to achieve desorption, while simultaneously communicating a cooling-air current from the waste-air duct to the cabin through the other of the reactors and the intake-air duct; and means for circulating an air current directly through the waste-air duct, the heating device and the cabin during a heating phase.

According to yet another aspect of the invention, there is provided an apparatus for heating and/or cooling a cabin in a motor vehicle, comprising an intake-air duct connected to the cabin; a waste-air duct connected to the cabin; a sorption reactor in the form of a rotating cylindrical body defining therein three separate reaction chambers, each of which contains a sorbent; a humidifier disposed in the intake-air duct to cool an intake-air current into the cabin; a heating device; means for communicating, during a cooling phase, a heating-air current from the heating device to one of the reaction chambers to achieve desorption, while simultaneously communicating a cooling-air current from the waste-air duct to the cabin through another of the reaction chambers and the intake-air duct; and means for circulating an air current directly through the waste-air duct, the heating device and the cabin during a heating phase.

Other objects, features and advantages of the present invention will become apparent to those skilled in the art when the preferred embodiments are more fully described below with reference to the drawings.

BRIEF DESCRIPTION OF THE DRAWINGS

Further features of the invention will be described with reference to the drawings, in which.

DETAILED DESCRIPTION OF THE PREFERRED EMBODIMENTS

Figure 1:
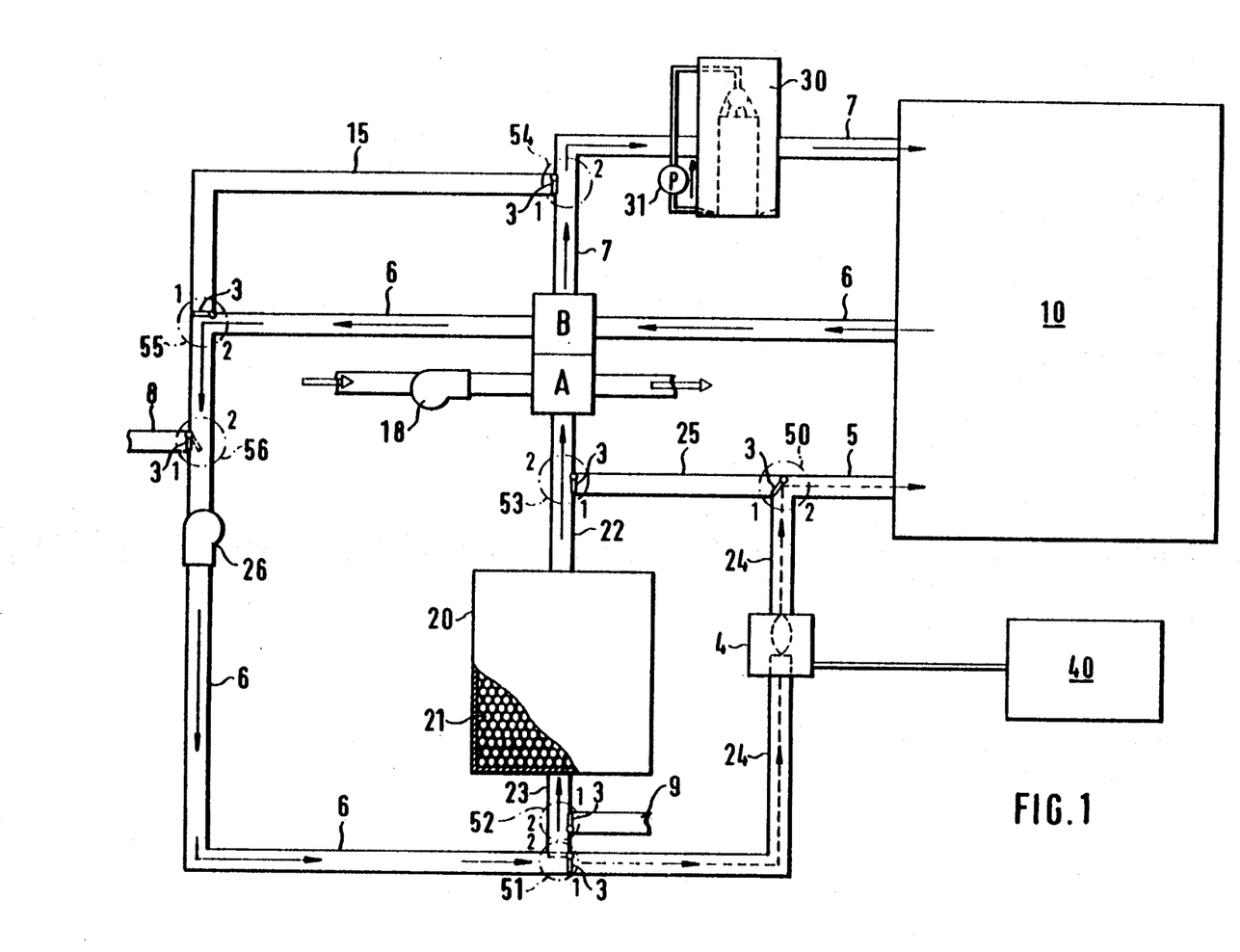
FIG. 1 shows a schematic representation of an apparatus according to the invention having a fuel heater, in cooling or heating operation.

The apparatus represented in FIG. 1 serves to heat and/or cool a cabin such as the passenger compartment in a motor vehicle, the sleeping cabin in a truck, the living compartment in a mobile home or the like. To the cabin 10 there is connected a warm-air duct 5, a waste-air duct 6 and an intake-air duct 7. The warm-air duct 5 can also be configured together with the intake-air duct 7 as a single duct.

The waste-air duct 6 is connected to a duct 23 which leads into the chamber 21 of a sorption reactor 20. In the chamber 21, there is disposed a sorbent such as zeolite or the like. The end of the reaction chamber 21 opposite the duct 23 opens into a further duct 22, which is connected, in the embodiment shown, to the intake-air duct 7. The intake-air duct 7 and the waste-air duct 6 intersect, with a cross-current heat exchanger B being disposed at the point of intersection. Downstream of the heat exchanger B, a fresh-air duct 8 opens into waste-air duct 6 by virtue of an air-current control element 56. Between the mouth of the fresh-air duct 8 and the duct 23 leading to the reactor 20, there is provided in the waste-air duct 6 a fan 26.

That duct 22 leading from the reactor 20 is connected to the intake-air duct 7 and a heat exchanger A, through which, in the cross-current, fresh-air can be conducted by means of a fan 18 in order to evacuate waste heat.

The ducts 22 and 23 of the sorption reactor 20 can be interconnected via a bridging duct 15, which is connected at one end to the intake-air duct 7 via an air-current control element 54 at the output of the cross-current heat exchanger B, and at another end to the waste-air duct 6 upstream of the fresh-air duct 8 via an air-current control element 55.

In the intake-air duct 7 there is disposed, shortly before its emergence into the cabin 10, a humidifier 30. Water is circulated in the humidifier 30 by means of a pump 31 in order to humidify the air current flowing through the humidifier.

The apparatus also includes a heating device 4, which is preferably a fuel heater. The fuel heater 4 is supplied with fuel from a tank 40. Preferably, the tank 40 is also the fuel tank of the vehicle.

The fuel heater 4 is disposed in a heating-air duct 24, which is connected via an air-current control element 51 to the duct 23 of the reactor 20. Between the air-current control element 51 and the reactor 20, a waste-air pipe socket 9 is connected via an air-current control element 52 to the duct 23. The other end of the heating-air duct 24 is connected via an air-current control element 50 both to the warm-air duct 5 and to an air conduit 25. The air conduit 25 creates, via an air-current control element 53, a connection between the heating air duct 24 and duct 22 which leads from the reactor 20 in FIG. 1.

To cool the cabin 10, the air-current control elements 51, 52, 53, 54 and 55 are switched in such a way that their valves 3 lie in the positions designated as "1" in FIG. 1. The fan 26 then extracts air from the cabin 10 via the waste-air duct 6. The extracted air enters into the sorption reactor chamber 21 via the air-current control elements 51 and 52 and the duct 23, whereupon it takes up adsorption heat and releases moisture. The dry, warm air current flows via the duct 22 and the air-current control elements 53 and 54 across the humidifier 30, in which the air cools down as a result of taking up liquid.

The cool air then enters via the intake-air duct 7 into the cabin 10. The operation of such an apparatus is described in detail in German Patent Application P 41 25 993.9, which is incorporated herein by reference.

Where necessary, the heated, dry air current can be pre-cooled as it passes through the cross-current heat exchanger A by the switching-on of the fan 18. In the after-connected cross-current heat exchanger B, an additional heat exchange takes place between the waste-air current and the intake-air current. Moreover, by partially opening the valve 3 of the air-current control element 56, it is possible to add a quantity of fresh air to the waste-air current.

To heat the cabin 10, the valve 3 of the air-current control element 51 is switched to the position designated "2" (shown in dashed representation) and the valve 3 of the air-current control element 50 to the position designated "1". The waste-air current alone, or where appropriate, the waste-air current mixed with fresh air, enters the heating-air duct 24 via the air-current control element 51, is heated up in the fuel heater 4 and is supplied via the warm-air duct 5 directly to the cabin 10. It is thereby possible for the cabin 10 to be heated without using the sorption reactor 20, allowing the reactor to be designed solely on the basis of a required cooling capacity.

Figure 2:
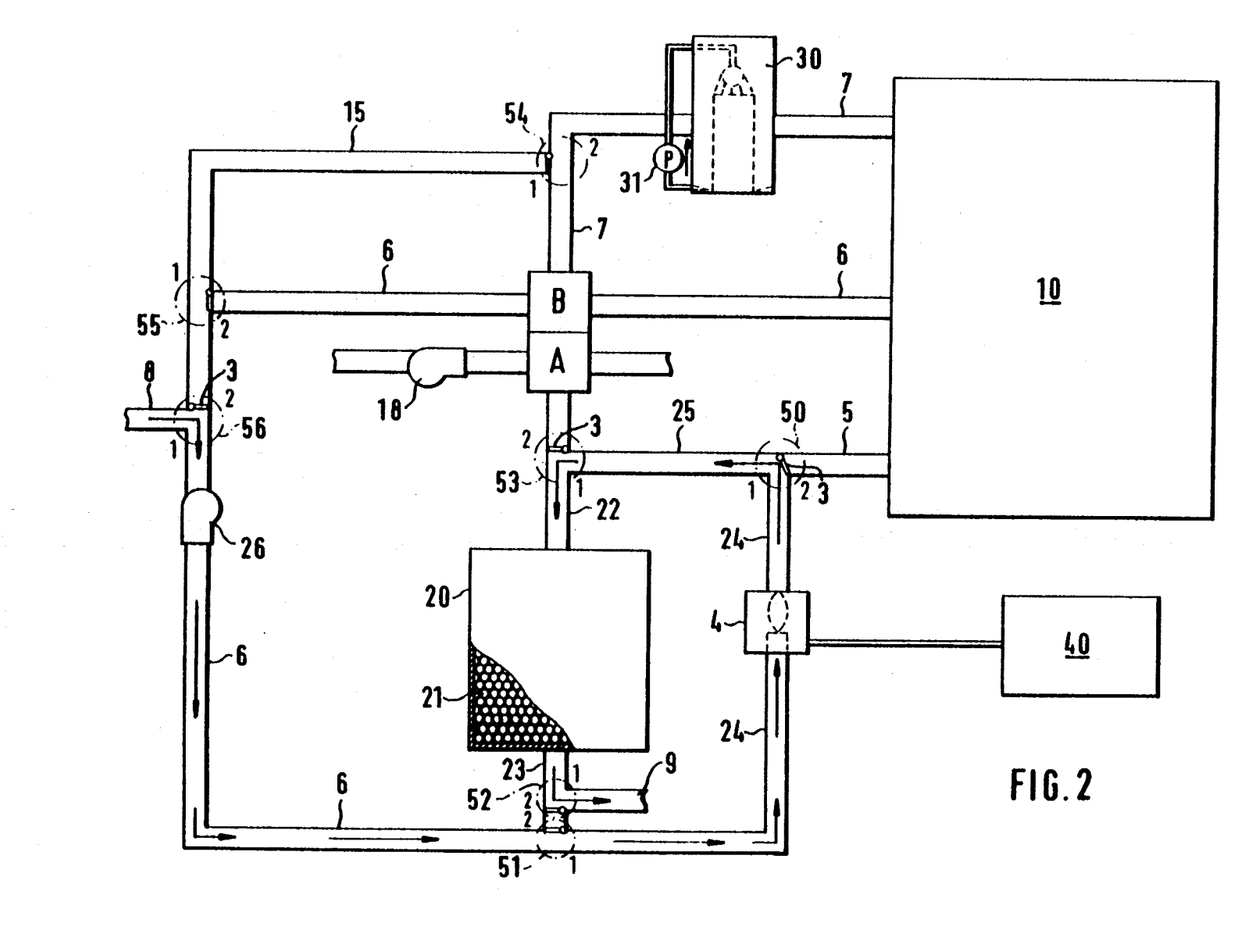
FIG. 2 shows a schematic representation of an apparatus according to FIG. 1 in desorption operation.

Towards the end of an adsorption phase, the reactor 20 has to be desorbed for regeneration. For this purpose, the air-current control elements 50, 51, 52, 53 and 56 are switched to the positions designated "2". The fresh-air current which is drawn in through the fresh-air duct 8 enters the heating-air duct 24 via the air-current control element 51, is heated up in the fuel heater 4 and is supplied via the air-current control element 50, the air conduit 25 and the air-current control element 53, and via the duct 22, to the reaction chamber 21. The evaporating moisture is discharged from the air current via the duct 23 and the waste-air duct 9.

As revealed by a comparison of the directions of flow in the reactor 20 during the cooling mode (FIG. 1) and the desorption mode (FIG. 2), the heating-air current flows through the reactor in a direction opposite the flow of the cooling-air current. This ensures a rapid and energetically favorable desorption.

Figure 3:
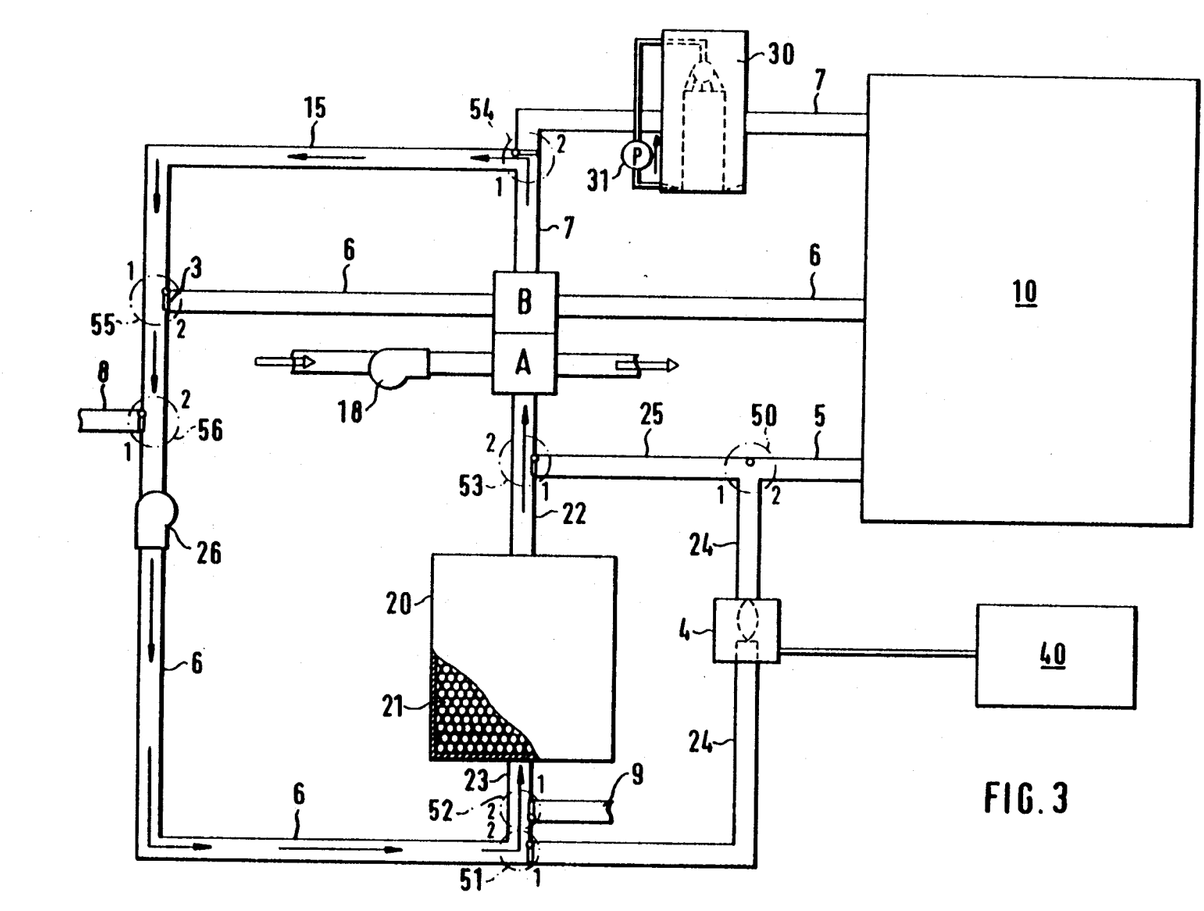
FIG. 3 shows a schematic representation according to FIG. 1 in reactor-cooling operation.

In order to ensure a rapid supply of cooling air to the cabin 10 following a completed desorption phase, it is envisaged according to FIG. 3 to switch, for a predefinable time span, the air-current control elements 51, 52, 53 and 56 to the position designated "1" and the air-current control elements 54 and 55 to the position designated "2". The reactor is thereby "short-circuited" in terms of flow mechanics by means of the bridging duct 15, so that when the fan 26 is switched on, a circulating-air current is generated. When the fan 18 is switched on, this circulating-air current is permanently cooled via the cross-current heat exchanger A, so that the temperature in the sorption chamber 21 is rapidly reduced. Once the sorbent has cooled down, the air-current control elements are again switched in accordance with FIG. 1, thereby allowing a further cooling of the cabin 10.

The apparatus according to the embodiment of FIGS. 1 to 3 constitutes a discontinuous system in which the cooling of the cabin 10 has to be interrupted for the desorption of the sorbent. In the embodiment shown in FIGS. 4 and 5, a continuous system is represented by which uninterrupted cooling of the cabin 10 is possible.

The basic construction of the apparatus is identical, for which reason the same reference symbols are used for identical parts. In place of a reactor 20, in the apparatus according to FIGS. 4 and 5 two reactors 20.1 and 20.2 are provided. The ducts 22.1 and 22.2 of the reactors 20.1 and 20.2 are connected via air-current control elements 52.1 and 52.2 and via a transverse duct 11 to the discharge-air duct 9, and are connected via air-current control elements 53.1 and 53.2 to the intake-air duct 7. The waste-air duct 6 is connected to the ducts 23.1 and 23.2 via the air-current control elements 52.1 and 52.2 respectively. The ducts 22.1 and 22.2 are connected via air conduits 25 to the heating-air duct 24. One end of the heating-air duct 24 is connected via an air-current control element 50 to the air conduit 25 and the warm-air duct 5, while the other end of the heating-air duct 24 can be selectively connected via the air-current control element 54 either to a fresh-air duct 8' or to a further waste-air pipe socket 6' of the cabin 10. In the heating-air duct 24 there is disposed the heat exchanger A of the intake-air duct 7, the fan 18 being situated between the air-current control element 54 and the heat exchanger A. Downstream of the heat exchanger A there opens out a discharge-air duct 9' before the fuel heater 4, by virtue of an air current control element 57. The fuel heater 4 is connected to a fuel tank 40 in accordance with the embodiment according to FIGS. 1 and 2.

Figure 4:
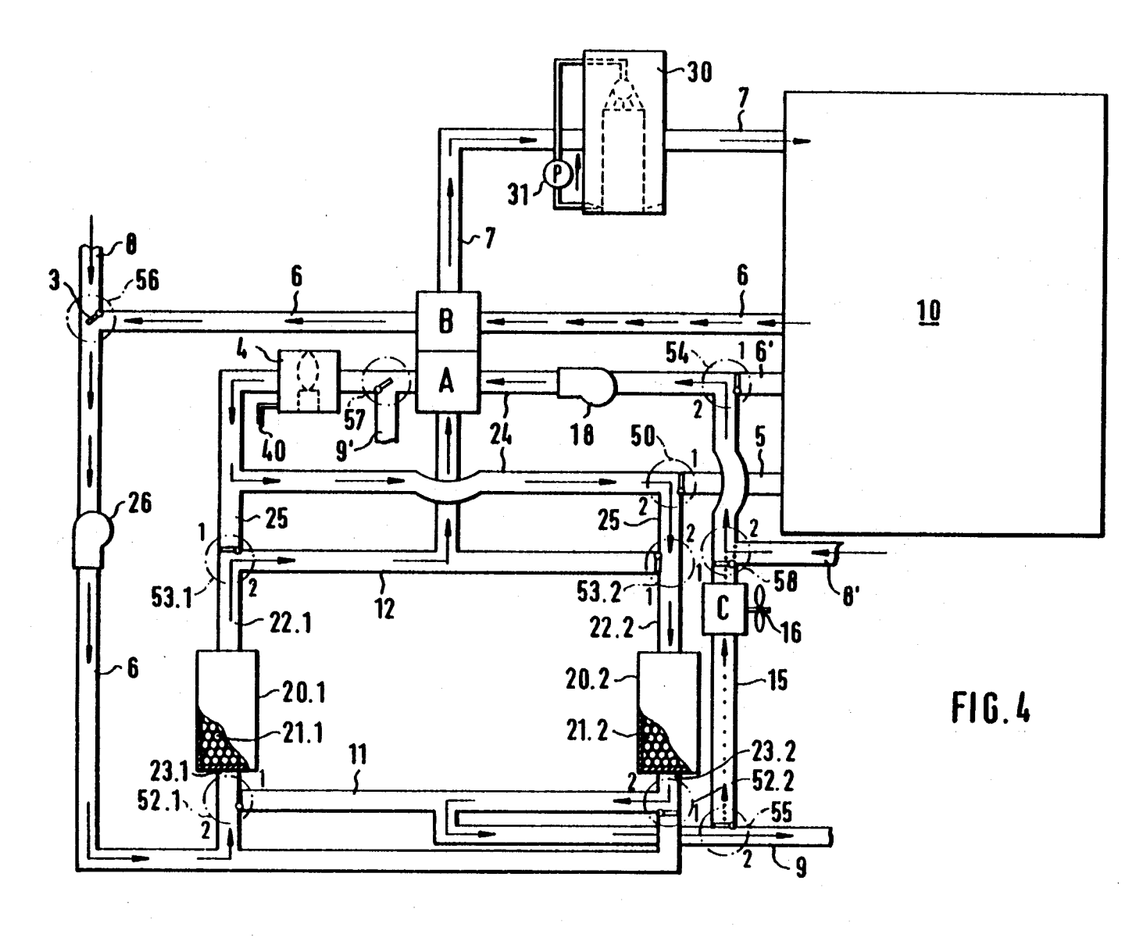
FIG. 4 shows a schematic representation of a further illustrative embodiment of an apparatus according to the invention in simultaneous cooling operation and desorption operation.
Figure 5:
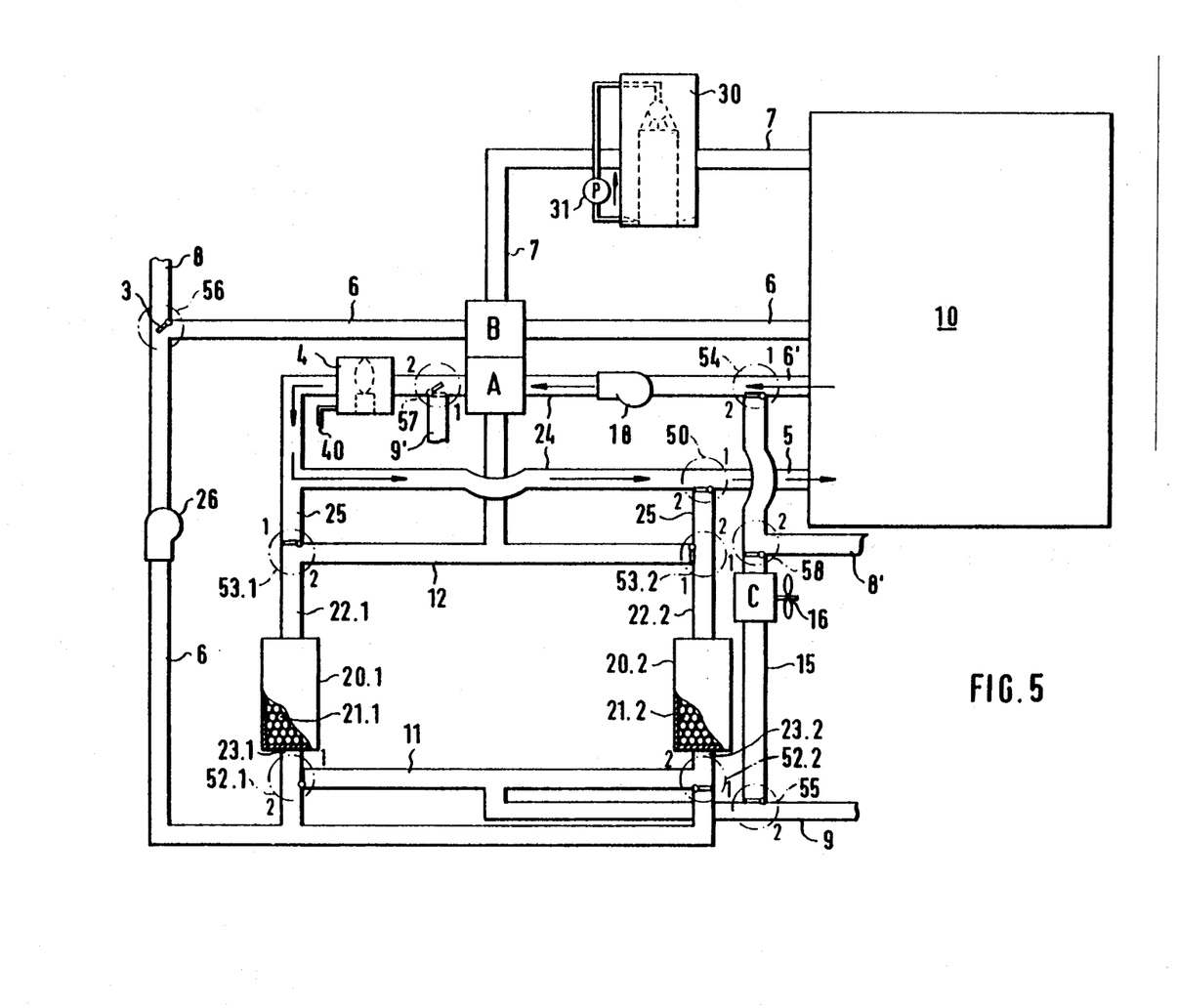
FIG. 5 shows a schematic representation of the apparatus according to FIG. 4 in heating operation.

In order to enable the reactor to cool following the desorption phase, a bridging duct 15 is again provided, which connects the fresh-air duct 8' to the discharge-air duct 9 via air-current control elements 55, 58. In the bridging duct 15 there is disposed a heat exchanger C, through which fresh air is conducted, as cooling air, by means of a fan 16.

For the cooling (FIG. 4) of the cabin 10, all air-current control elements are initially switched to the position designated "1" and the fan 26 started up. The waste-air current extracted via the waste-air duct 6 then flows via the air-current control element 52.1 into the reactor 20.1 and enters via the air-current control element 53.1 and the transverse duct 12, across the intake-air duct 7 and the humidifier 30, into the cabin 10. If the air-current control elements 52.1, 52.2, 53.1 and 53 2 are switched to the position designated "2", the waste-air current will enter via the air-current control element 53.2 into the reactor 20.2 and will be discharged via the air-current control element 53.2 and the transverse duct 12, across the air duct 7 and the humidifier 30, into the cabin 10. If a reactor 20.1 or 20.2 is exhausted, then the air-current control elements 52.1 to 53.2 need merely to be switched over. The operating method of an apparatus of this type is extensively described in German Patent Application P 41 33 917.7, which is incorporated herein by reference.

While the one reactor 20.1 or 20.2 is being used for cooling purposes, the non-used reactor 20.2 or 20.1 respectively, can be simultaneously desorbed. The valves 3 of air-current control elements 50, 54, 55 and 58 are herein set, irrespective of the reactor to be desorbed, at the position designated "1". Fresh air is drawn into the fresh-air duct 8' by the started-up fan 18, and into the heating-air duct 24. The fresh air is then supplied via the heat exchanger A to the fuel heater 4. The fresh-air current supplied through the heat exchanger A takes up heat energy from the crosswise-conducted intake-air current 7, which flows out from the other reactor 20.1.

The hot-air current leaving the fuel heater 4 flows to the reactor 20.2 or 20.1 which is not being used for cooling and is discharged via the transverse duct 11 and the discharge-air pipe socket 9. In order to enable the reactor to cool down rapidly following a successfully conducted desorption, the valves 3 of the air-current control elements 55 and 58 are switched to the position designated "2", thereby creating a flow through the bridging duct 15 and the heat exchanger C disposed therein. The fuel heater 4 is now disconnected and the air-current control element 57 preferably set at the position designated "1". The heat evacuated from the reactor with the circulating-air current is transferred in the heat exchanger C to the cooling-air current generated by the fan 16. The cooling phase adjoining the desorption phase can be provided for a predetermined time or may depend upon the temperature of the air leaving the reactor.

For the heating of the cabin 10, as can be seen in FIG. 5, only the heating-air duct 24 is operated. The air-current control elements 50 and 54 are switched to the position designated "2", while the air-current control element 53.1 is set at the position designated "1". The air-current control element 57 is set preferably to the position designated "1".

The fan 18 generates a waste-air current, which is extracted via the duct 6' from the cabin 10 and supplied to the fuel heater 4 through the (inactive) heat exchanger A. The hot-air current leaving the fuel heater 4 then enters via the warm-air duct 5 directly into the cabin 10. By partially opening the air-current control element 57, part of the waste-air current can be evacuated via the discharge-air pipe socket 9'.

Figure 6:
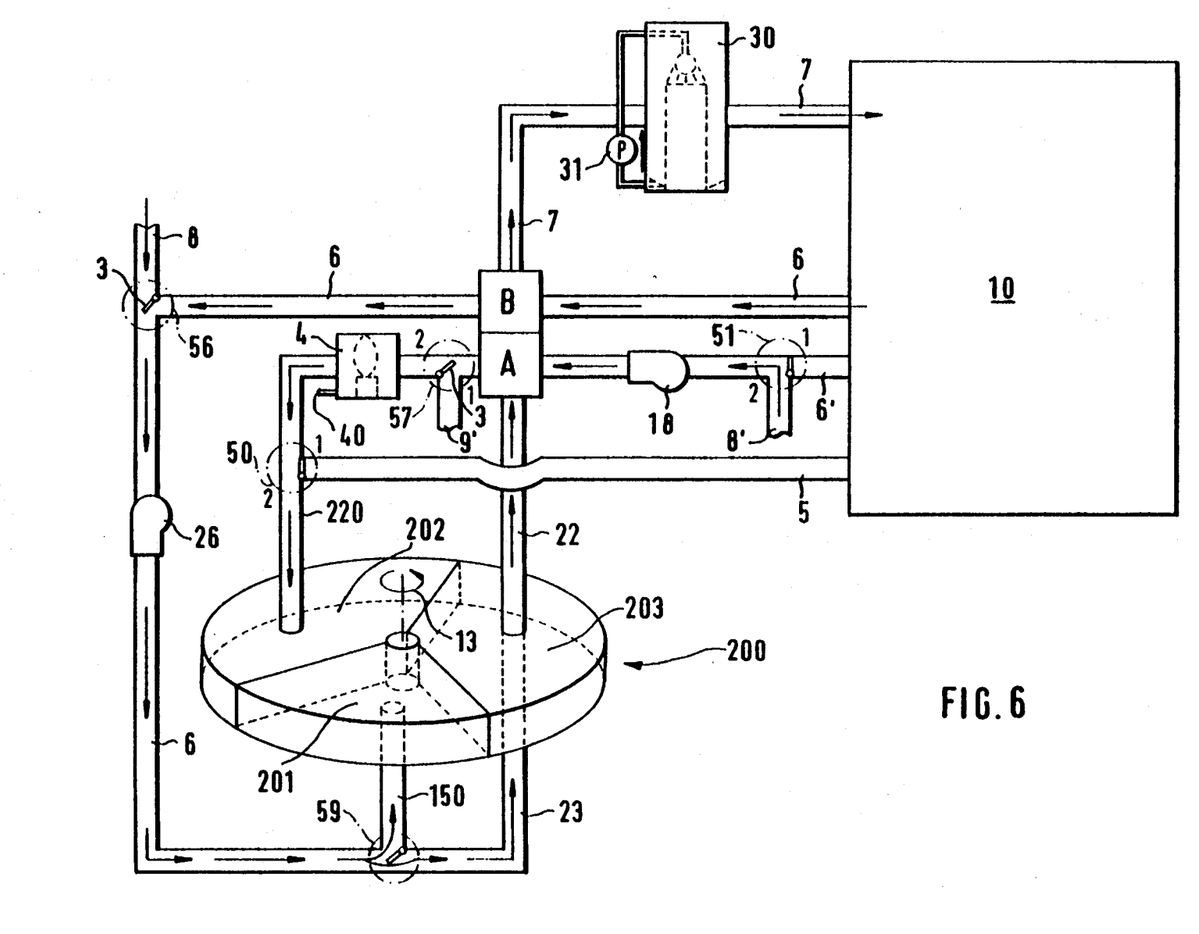
FIG. 6 shows a schematic representation of another illustrative embodiment of the apparatus according to the invention in continuous cooling and desorption and reactor-cooling operation.
Figure 7:
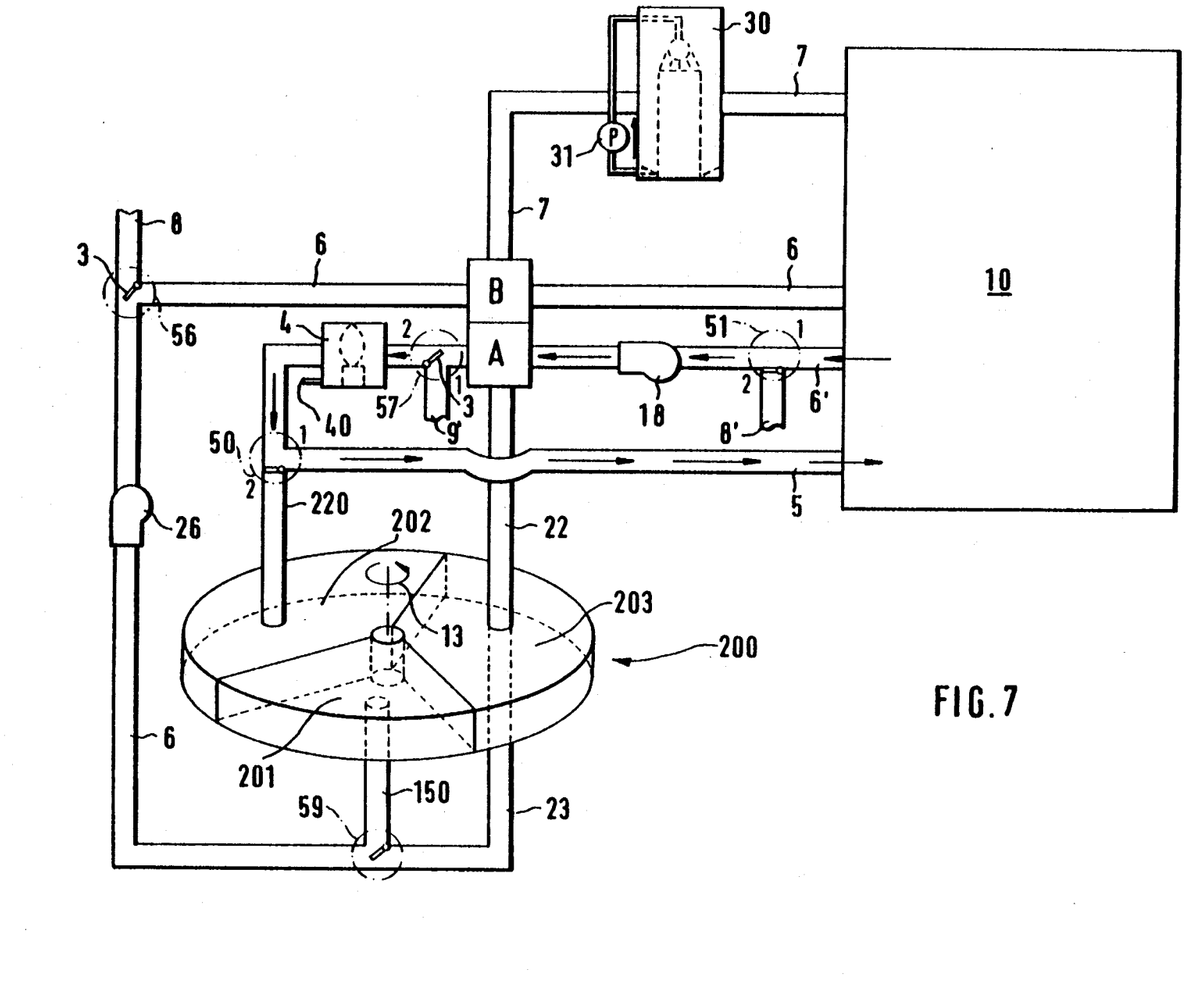
FIG. 7 shows a schematic representation of an apparatus according to FIG. 6 in heating operation.

A further embodiment shown in FIGS. 6 and 7 also corresponds to the basic construction of the apparatus according to FIGS. 1 to 3 and 4 to 5. In this embodiment, the sorption reactor 200 is constructed as a cylindrical rotational body having three chambers 201, 202, 203 which are separated from one another in the circumferential direction and which have various, but preferably equal, angles of extent (measuring, for example, around 120°). The mutually separated chambers are filled with a sorbent such as zeolite or the like. The reactor rotates in the direction of arrow 13 about a rotational axis. At one axial end of the reactor 200 there is disposed a supply duct 23 and a further air conduit 150, while at the other axial end of the reactor 200 there is disposed a further duct 22 and a heating-air duct 220. The ducts 22 and 23 lie approximately opposite one another. The overall arrangement of the ducts 22, 220, 150 and 23 is provided such that the ducts 23 and 22, at time t, are assigned to the chamber 103, the duct 220 to the chamber 202, and the duct 150 to the chamber 201. By rotating the reactor 200 in the direction of arrow 13, the chambers alternate, as described in German Patent Application P 41 33 917.7 of the Applicant, the contents of which were previously incorporated herein by reference.

To cool the cabin 10, there is extracted via the waste-air duct 6 a waste-air current by means of the fan 26. Fresh air is mixed with the waste-air current as required at the air-current control element 56, according to the setting (or position) of the valve 3. The waste-air, mixed-air or exclusively fresh air current flows via the air-current control element 59 and the duct 23 to the reactor 200 and flows through the chamber 203, whereupon adsorption heat is taken up accompanied by the release of moisture. The heated air current flows through the heat exchangers A and B via the duct 22, is cooled down and takes up moisture in the humidifier 30. The temperature of the air is thus further reduced before the air is supplied for cooling purposes to the cabin 10. During the cooling operation using the chamber 203, an air current is supplied via the fresh-air duct 8', by the fan 18, across the heat exchanger A to the fuel heater 4. Whereupon, at the air-current control element 57, according to the setting of the valve 3, a part-quantity is able to be evacuated via the waste-air pipe socket 9'. The hot-air current leaving the fuel heater 4 is supplied via the air-current control element 50 and the heating-air duct 220 to the chamber 202, as a result of which the latter is desorbed. The moisturized hot-air current is discharged (and, where necessary, conducted) into the open air on that axial side of the chamber 202 lying opposite the duct 220.

The chamber 201 is subjected via the air conduit 150 to a cool air current by virtue of being branched off from the air-current control element 59, whereby the chamber 201 is cooled following completion of the desorption phase and before the start of the adsorption phase. The rotational velocity of the sorption reactor 200 is such that the desorption of another chamber via the heating-air duct 220 and a sufficient cooling of an already desorbed chamber via the air conduit 150 is ensured, provided the capacity of a sorption chamber between the ducts 22 and 23 is sufficient.

To heat the cabin 10, the air-current control elements 50 and 51 are switched to the position designated "2", so that a waste-air current extracted by the fan 18 is supplied to the heating device 4 via the waste-air pipe socket 6' and is returned in a heated state, via the warm-air duct 5, directly into the cabin 10.

The basic concept of the invention can be seen in the fact that the heating device itself is used for the direct heating-up of the cabin, so that during the heating operation no load is placed upon the sorbent in the sorption reactor. The sorbent thus essentially furnishes the necessary cooling requirement. The number of necessary desorption phases can be kept low. Expediently, a reduction in the cubage of the reactor is also possible, as a result of which the overall apparatus requires less construction space and can thus be used without difficulty even in small vehicles.

If a switchable fuel heater is used as the heating device, the cabin in a motor vehicle can be cooled and heated even without the engine running, so that essentially no noise pollution is obtained while the apparatus is in operation. This is particularly important in the air-conditioning of sleeping cabins in trucks.

While there have been described and illustrated specific embodiments of the invention, it will be obvious that various changes, modifications and additions can be made herein without departing from the field of the invention which should be limited only by the scope of the appended claims.

What is claimed is:

1. An apparatus for heating and/or cooling a cabin in a motor vehicle, comprising:
    at least one sorption reactor defining therein a reaction chamber containing a sorbent;
    a first reactor duct which carries an air current into said reaction chamber;
    a second reactor duct leading from said reaction chamber;
    an intake-air duct connected between said second reactor duct and said cabin;
    a humidifier disposed in said intake-air duct;
    a heating device; and
    a first air-current control element positioned so as to selectively communicate a heating-air current issuing from said heating device to either a reactor duct or said cabin;
    wherein, during adsorption of said reactor, an air current flowing through said reactor takes up adsorption heat while releasing moisture, and is cooled by said humidifier before flowing into said cabin; and
    wherein, during desorption of said reactor, said air current is heated by the heating device and flowed through the reactor to take up moisture.

2. An apparatus according to claim 1, further comprising a warm-air duct connected between the first air-current control element and said cabin to supply said heating-air current to said cabin.

3. An apparatus according to claim 2, further comprising a waste-air duct connected to said cabin, a heating-air duct connected between said first air-current control element and said waste-air duct, and an air conduit connected between said first air-current control element and a second air-current control element, wherein said heating device is disposed in said heating-air duct and said second air-current control element is positioned so as to selectively communicate a heating-air current issuing from said first air-current control element to either a reactor duct or said intake-air duct.

4. An apparatus according to claim 1, wherein said second air-current control element is connected to said second reactor duct, whereby a heating-air current during the desorption phase flows through said reactor in an opposite direction to the flow of an air current through said reactor during the adsorption phase.

5. An apparatus according to claim 1, wherein the heating device is a switchable fuel heater.

6. An apparatus according to claim 5, wherein the fuel heater is fed from a fuel tank of the motor vehicle.

7. An apparatus according to claim 1, further comprising a bridging duct connected at one end via a third air-current control element to said first reactor duct and at another end to said second reactor duct via a fourth air-current control element.

8. An apparatus according to claim 7, further comprising a heat exchanger which uses fresh air as a coolant, said heat exchanger being disposed within said bridging duct.

9. An apparatus for heating and/or cooling a cabin in a motor vehicle, comprising:
    an intake-air duct connected to the cabin;
    a waste-air duct connected to the cabin;
    at least one sorption reactor having at least one reaction chamber which contains a sorbent;
    a humidifier disposed in said intake-air duct to cool an intake-air current into said cabin;
    a heating device;
    means for selectively communicating said intake-air current through said at least one reactor to take up adsorption heat while releasing moisture during adsorption before said intake-air current passes said humidifier in said intake air current, and for selectively communicating a heating-air current from said heating device through said at least one reactor to take up moisture during desorption; and
    means for circulating an air current directly through said waste-air duct, said heating device, and said cabin during a heating phase.

10. An apparatus for heating and/or cooling a cabin in a motor vehicle comprising:
a first sorption reactor defining therein a first reaction chamber containing a sorbent;
a second sorption reactor defining therein a second reaction chamber containing a sorbent;
each of said sorption reactors having a first reactor duct which carries an air current into said first and second reaction chambers, respectively, and a second reactor duct leading from said first and second reaction chambers, respectively;
an intake-air duct connected between said second reactor ducts and said cabin;
a humidifier disposed in said intake-air duct to cool an intake-air current into said cabin;
a heating device;
a waste-air duct connected between said cabin and said heating device;
means for communicating, during a cooling phase, a heating-air current from said heating device to one of said reactors to achieve desorption, while simultaneously communicating a cooling-air current from said waste-air duct to said cabin through the other of said reactors and said intake-air duct; and
means for circulating an air current directly through said waste-air duct, said heating device and said cabin during a heating phase.

11. An apparatus according to claim 10, wherein said means for communicating a heating-air current includes a fresh-air duct, a fan to draw a heating-air current in through said fresh-air duct, a first air duct between said fresh-air duct and said fan, a second air duct between said fan and a first cross-flow heat exchanger, a third air duct between said first heat cross-flow exchanger and said heating device, and a fourth air duct between said heating device and a first air-current control means for selectively communicating said heating-air current to a second reactor duct of one of said reactors to achieve desorption.

12. An apparatus according to claim 11, wherein said means for communicating a cooling-air current includes said waste-air duct, a second cross-flow heat exchanger disposed in said waste-air duct, a fan disposed in said waste-air duct to create a cooling-air current, a second air-current control means for selectively communicating said cooling-air current to a first reactor duct of the other of said reactors to achieve adsorption, and a third air-current control means for communicating the second reactor duct of the other of said reactors to said intake-air duct.

13. An apparatus according to claim 12, wherein said means for circulating an air current during a heating phase includes a fourth air-current control means for communicating a waste-air current from said waste-air duct to said fan while blocking said fresh-air duct, said first air duct, said fan, said second air duct, said first heat exchanger, said third air duct, said heating device, said fourth air duct, and a fifth air-current control means for communicating said air current to a warm-air duct leading into said cabin while blocking said second reactor ducts.

14. An apparatus for heating and/or cooling a cabin in a motor vehicle, comprising:
an intake-air duct connected to the cabin;
a waste-air duct connected to the cabin;
a sorption reactor in the form of a rotating cylindrical body defining therein three separate reaction chambers, each of which contains a sorbent;
a humidifier disposed in said intake-air duct to cool an intake-air current into said cabin;
a heating device;
means for communicating, during a cooling phase, a heating-air current from said heating device to one of said reaction chambers to achieve desorption, while simultaneously communicating a cooling-air current from said waste-air duct to said cabin through another of said reaction chambers and said intake-air duct; and
means for circulating an air current directly through said waste-air duct, said heating device and said cabin during a heating phase.

15. An apparatus according to claim 14, wherein said means for communicating a heating-air current includes first and second reactor ducts which are disposed on opposite sides of a reaction chamber during adsorption.

16. An apparatus according to claim 15, wherein said means for communicating a heating-air current further includes a fresh-air duct, a fan to draw a heating-air current in through said fresh-air duct, a first air duct between said fresh-air duct and said fan, a second air duct between said fan and a first heat exchanger, a third air duct between said first heat exchanger and said heating device, and a fourth air duct between said heating device and a first air-current control means for selectively communicating said heating-air current to one of said reactor ducts.

17. An apparatus according to claim 16, wherein said means for communicating a cooling-air current includes said waste-air duct, a second heat exchanger disposed in said waste-air duct, a fan disposed in said waste-air duct to create a cooling-air current, a second air-current control means for selectively communicating said cooling-air current to said first reactor duct, and third air-current control means for communicating said second reactor duct to said intake-air duct.

18. An apparatus according to claim 17, wherein said means for circulating an air current during a heating phase includes:
a fourth air-current control means for communicating a waste-air current from said waste-air duct to said fan while blocking said fresh-air duct; said first air duct; said fan; said second air duct; said first heat exchanger; said third air duct; said heating device; said fourth air duct; and a fourth air-current control means for selectively communicating said air current to said second reactor duct or a warm-air duct leading into said cabin.

* * * * *